United States Patent [19]

Jacobson

[11] B 4,036,653

[45] July 19, 1977

[54] AMORPHOUS SILICON NITRIDE COMPOSITION CONTAINING CARBON, AND VAPOR PHASE PROCESS

[75] Inventor: Howard Wayne Jacobson, Wilmington, Del.

[73] Assignee: E. I. Du Pont de Nemours and Company, Wilmington, Del.

[21] Appl. No.: 581,564

[22] Filed: May 28, 1975

[44] Published under the second Trial Voluntary Protest Program on March 23, 1976 as document No. B 581,564.

[51] Int. Cl.$^2$ .............. C04B 35/58; C23C 11/14
[52] U.S. Cl. .............. 106/47 R; 106/55; 106/56; 106/65; 106/73.4; 106/73.5; 264/65; 423/266; 423/344; 427/94
[58] Field of Search ........... 106/39.5, 56, 73.5, 106/47; 423/344; 427/94

[56] References Cited

U.S. PATENT DOCUMENTS

| | | | |
|---|---|---|---|
| 3,226,194 | 12/1965 | Kuntz | 423/344 X |
| 3,253,886 | 5/1966 | Lamphrey et al. | 423/344 |
| 3,352,637 | 11/1967 | Heymer et al. | 423/344 X |
| 3,492,100 | 1/1970 | Roubin et al. | 106/55 X |
| 3,565,674 | 2/1971 | Boland et al. | 427/94 |
| 3,574,677 | 4/1971 | Pammer et al. | 427/94 |
| 3,637,423 | 1/1972 | Sestrich | 427/94 X |
| 3,652,331 | 3/1972 | Yamazaki | 427/94 |
| 3,892,583 | 7/1975 | Winter et al. | 106/55 |
| 3,959,446 | 5/1976 | Mazdiyasni et al. | 423/344 |
| 3,979,500 | 9/1976 | Sheppard et al. | 423/344 |

FOREIGN PATENT DOCUMENTS

| | | | |
|---|---|---|---|
| 1,957,952 | 5/1971 | Germany | 427/94 |

OTHER PUBLICATIONS

Crandall, W. B. et al.—"Preparation and evaluation of Si—Al—O—N"
IIT Research Inst.—Prepared for Aerospace Research Labs, USAFAD-A201-997 (69 pp.) June 1973
Chem. abstracts 72, 80949v
Chem. abstracts 76, 118235c Primary Examiner—Helen M. McCarthy
Attorney, Agent, or Firm—Carol K. Stouffer

[57] ABSTRACT

An amorphous silicon nitride composition consisting essentially of from 95.0% to 99.9% by weight of amorphous silicon nitride and from 0.1% to 5.0% of carbon prepared by the vapor phase reaction of silicon tetrachloride, ammonia, and a gaseous hydrocarbon at temperatures from 1000° C. to 1500° C. This composition is particularly useful in the preparation of fully dense ceramics requiring high strength at elevated temperatures.

9 Claims, 1 Drawing Figure

AMORPHOUS SILICON NITRIDE COMPOSITION CONTAINING CARBON, AND VAPOR PHASE PROCESS

BACKGROUND OF THE INVENTION

This invention is generally directed to silicon nitride compositions and methods for their preparation and is particularly directed to silicon nitride containing carbon uniformly distributed throughout the silicon-nitrogen matrix.

In structural applications, such as high temperature ceramics, silicon nitride is characterized by low thermal expansion coefficients, moderate thermal conductivities and resistance to thermal shock. However, the difficulty of fabricating silicon nitride into fully dense and suitable shapes has limited its widespread use in such applications.

Two general methods for forming relatively dense-shaped silicon nitride are commonly used. One method, known as "reaction bonding", comprises compacting silicon powder to the desired shape and exposing the silicon compact to molecular nitrogen at about 1400°C. The product is a mixture of $\alpha$ and $\beta$ silicon nitride having a porosity of about 25%. Since the original dimensions of the silicon compact remain substantially unchanged during the nitriding, quite complex shapes can be obtained, but the degree of porosity of the product is too high for applications requiring high strength. Another method, known as "hot-pressing", comprises nitriding powdered silicon to form an $\alpha$ silicon nitride powder and hot-pressing the $\alpha$ silicon nitride with 1% to 5% by weight of additives such as MgO or $Y_2O_3$ at 4000 psi and temperatures between 1700°C. to 1800°C. This method yields fully dense $\beta$ silicon nitride, but is limited to fairly simple shapes and is very expensive.

To overcome the problems associated with fabricating silicon nitride into useful high temperature materials, e.g., ceramics, a series of compounds known in the art as "SiAlON's" have been developed (K. H. Jack and W. I. Wilson, Nature Phy. Science, Vol. 238, July 1972 and Y. Oyama, Japan J. Appl. Phys., 11, p. 1572, 1972). These compounds result from the substitution of aluminum and oxygen into the $\beta$ silicon nitride lattice by reacting alumina ($Al_2O_3$) with $\beta$ silicon nitride. The SiAlON unit cell is like that of $\beta$ silicon nitride and is referred to as $\beta'$-$Si_3N_4$. It contains eight oxygen plus nitrogen atoms and has a range of homogeneity as $Si_{6-0.75x}Al_{0.67x}O_xN_{8-x}$ where $x$ is 0 to 6. Unlike unsubstituted silicon nitride, the SiAlON's sinter when fired in an inert atmosphere above 1500°C. and can therefore be processed by the conventional ceramic techniques such as extrusion, pressing and slip-casting to produce pre-fired shapes. SiAlON's are commonly prepared using additives such as AlN and MgO to enhance densification (W. B. Crandell et al., "The Preparation and Evaluation of SiAlON", U.S. contract No. F33615-73-C-4098, Aerospace Research Laboratories, united States Air Force). Although the SiAlON's prepared using additives are sufficiently dense for many applications, they generally exhibit relatively poor properties as a fabricated ceramic in high temperature applications. This is believed to be due to the formation of a magnesium-silicon-aluminum oxynitride crystal phase and/or a silicon-aluminum oxynitride crystal phase in addition to major SiAlON crystal phase, known as $\beta'$-$Si_3N_4$.

This invention provides for an amorphous silicon nitride which can be directly converted to fully dense uniphase SiAlON having the ease of fabrication of conventionally produced SiAlON and the high strength and thermal shock resistance of fully dense $\beta$ silicon nitride.

SUMMARY OF THE INVENTION

According to the invention there is provided an amorphous silicon nitride composition consisting essentially of from 95.0% to 99.9% by weight, and preferably from 99.0% to 99.7% by weight, of amorphous silicon nitride, calculated as $Si_3N_4$ and based on the total weight of the composition, and from 0.1% to 5.0% by weight, and preferably from 0.3% to 1% by weight, of carbon, calculated as elemental carbon and based on the total weight of the composition, the carbon being uniformly distributed within the silicon-nitrogen bonds in the amorphous silicon nitride. The term "amorphous" as used herein means that the silicon nitride composition exhibits no definite crystal structure when analyzed by X-ray diffraction. The carbon contained in the amorphous silicon nitride is not to be confused with a physical mixture of carbon particles with silicon nitride particles, where the carbon is not distributed within the silicon nitride itself. The amorphous silicon nitride composition is preferably in the form of a powder having a surface area of greater than 1 $m^2/g$.

The amorphous silicon nitride composition of the invention is prepared via a vapor phase process by the steps of (i) intimately contacting gaseous silicon tetrachloride ($SiCl_4$), gaseous ammonia ($NH_3$) and a gaseous hydrocarbon at a temperature from 1000°C. to 1500°C., and preferably from 1200°C. to 1300°C., (ii) condensing the products of the vapor phase reaction of step (i), and (iii) recovering the amorphous silicon nitride composition. The major products of the vapor phase reaction of step (i) are the amorphous silicon nitride composition of the invention and ammonium chloride ($NH_4Cl$). Minor amounts, i.e., less than 10% of silicon imides, e.g., $(SiN)_2NH$, may also be present. The amorphous silicon nitride composition can be separated from the other products by any separation methods which do not chemically affect the amorphous silicon nitride composition. For example, although $NH_4Cl$ is soluble in water, water should not be used because it can react with the amorphous silicon nitride composition and form silicon oxynitride when processed at high temperature, e.g., 1400°C. A preferred method for recovering the amorphous silicon nitride composition comprises passing molecular nitrogen or a mixture of molecular nitrogen and methane through the condensed products at a temperature from 700°C. to 1050°C. In this manner the $NH_4Cl$ is converted to gaseous HCl and $NH_3$ and any silicon imides which may be present are converted to silicon nitride and $NH_3$.

DETAILED DESCRIPTION OF THE INVENTION

Figure 1:
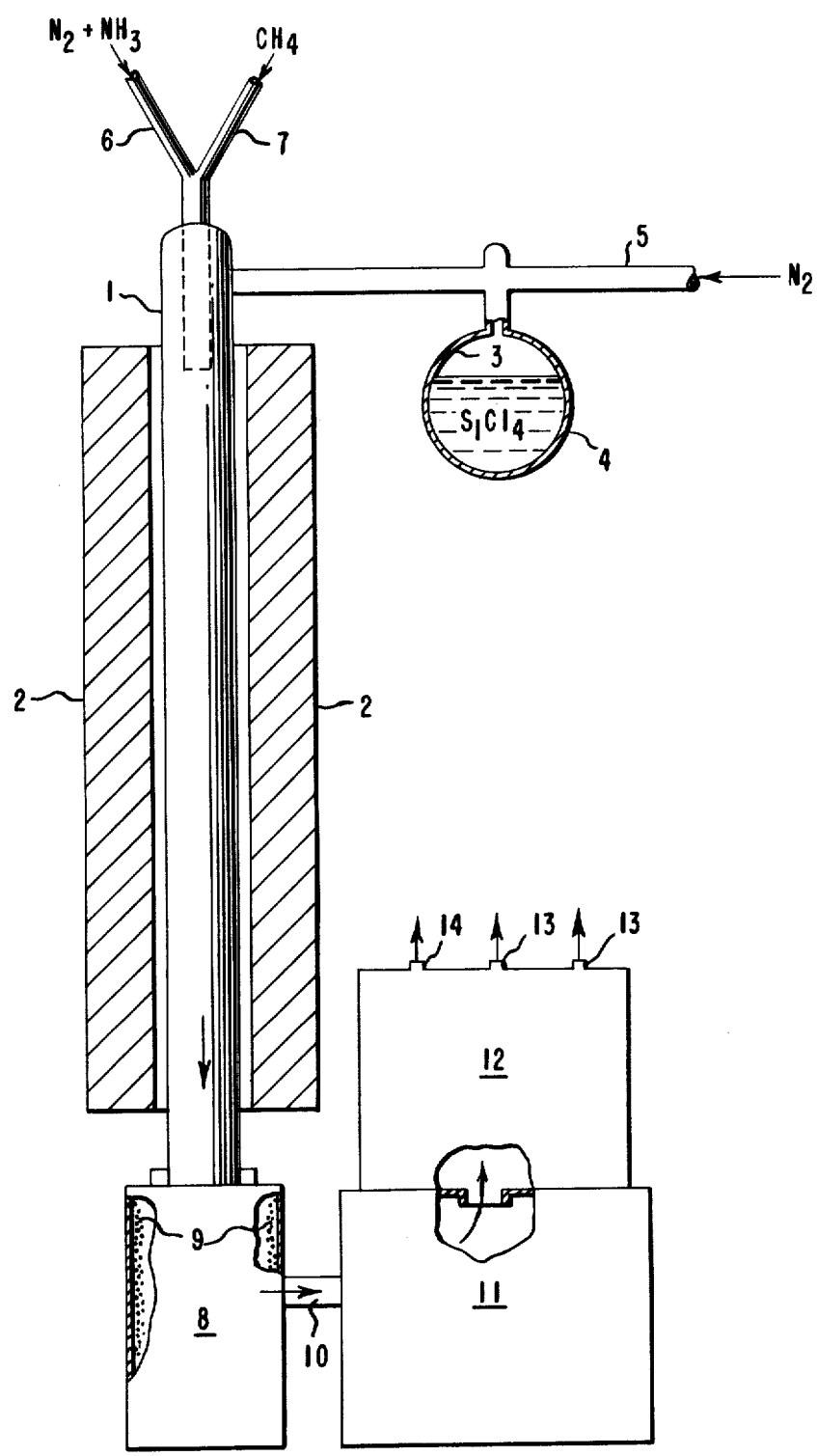
FIG. 1 illustrates a form of a laboratory apparatus shown schematically and not to scale, that can be used for carrying out the vapor phase process of the invention.

The source of starting materials, i.e., $SiCl_4$, $NH_3$ and hydrocarbon, used to prepare the amorphous silicon nitride composition of the invention is not critical. These starting materials can be prepared according to procedures well known in the art or purchased commercially.

The choice of hydrocarbon for use in preparing the amorphous silicon nitride is based primarily on the stability of the hydrocarbon in the gaseous phase at temperatures approaching the reaction temperature. That is, the hydrocarbon should not substantially decompose to form carbon or other undesirable decomposition products prior to the temperature at which $SiCl_4$ and $NH_3$ react to form silicon nitride, because the carbon formed will not be uniformly distributed within the silicon-nitrogen bonds of the amorphous silicon nitride product and the product will contain nonuniform masses of carbon. This nonuniformly distributed carbon is ineffective in processing the silicon nitride powder into a dense ceramic. In keeping with the criterion of stability, useful hydrocarbons are selected from alkanes, alkenes, alkynes, and aromatic hydrocarbons containing from 1 to 6 carbon atoms and 4 to 14 hydrogen atoms. The preferred hydrocarbon is methane because of its high stability under the reaction conditions employed.

Solid carbonaceous material cannot be used to prepare the amorphous silicon nitride composition of the invention, because the carbon will not be incorporated within the silicon-nitrogen bonds of the composition. Furthermore, it is essential that the carbon be incorporated in the composition at the time the silicon-nitrogen bonds are formed. That is, if carbon is added to amorphous silicon nitride after it is formed the product will not crystallize satisfactorily and will not contain a major amount of the $\beta$-phase when heated to a crystallizing temperature, e.g., 1500°C.

The amorphous silicon nitride composition of the invention can be prepared using any conventional apparatus capable of withstanding the temperatures of the vapor phase reaction. A preferred type of vapor phase reactor is shown in FIG. 1. Referring to FIG. 1, there is employed an elongated alumina tube, 1, which is surrounded by a heater or furnace, 2. The heater may be for example an electric heater which may be equipped with a thermocouple or other device, not shown, to measure and record a predetermined temperature to be applied to the gaseous reactants. In practice, the alumina tube 1 is heated to a temperature from 1000°C. to 1500°C. While the alumina tube 1 is being heated liquid silicon tetrachloride contained in vessel 3 is heated to from 40°C. to 58°C. (boiling point) by heating mantle 4. The vaporized $SiCl_4$ is carried into the alumina tube 1 by passing an inert gas, such as $N_2$, through conduit 5. At the same time a mixture of an inert gas, such as $N_2$ and $NH_3$, is passed to alumina tube 1, through conduit 6 and a gaseous hydrocarbon, such as $CH_4$, is passed to alumina tube 1 through conduit 7. Prior to entering the alumina tube 1 the reactant gases and carrier gases are typically passed through a drying tube, not shown, to insure the removal of any moisture which may be contained in the gases. The products of the gas phase reaction pass from alumina tube 1 to the first product receiver 8. The first product receiver is typically air cooled and made of pyrex to withstand the temperatures of the exit gases and reaction products. A major portion of $NH_4Cl$ produced from the vapor phase reaction remains as a condensate 9 on the walls of receiver 8. The remaining $NH_4Cl$ and amorphous silicon nitride composition pass through conduit 10 to a series of product receivers 11 and 12. Any number of product receivers can be used, but two is usually sufficient to insure that the solid products are removed from the exit gases. Exit carrier gases and unreacted starting gases pass through openings 13 in receiver 12. The solid products collected in receivers 11 and 12 are commonly combined and flushed with $N_2$ at temperatures from 700°C. to 1050°C. to remove residual $NH_4Cl$ from the amorphous silicon nitride composition and to insure that the silicon imides which may be present are converted to silicon nitride.

During the isolation of the amorphous silicon nitride composition care should be taken to insure that oxygen, e.g., molecular oxygen, air, water vapor, is not present in sufficient quantity to react with the silicon nitride composition. Oxygen may react with silicon nitride to form silicon oxynitride which contaminates the composition and degrade the physical properties.

The amorphous silicon nitride composition is typically in the form of a fine powder having a surface area greater than 1 $m^2/g$. The powder can be crystallized by heating in an inert atmosphere at a temperature from 1400°C. to 1700°C. for a period of time which depends upon the temperature of the heated powder. For example, at 1400°C. the powder will crystallize in four hours, at 1500°C. in one hour and at 1700°C. in ten minutes. The crystallized powder is at least 50% by weight in the $\beta$-$Si_3N_4$ phase, the remainder being in the $\alpha$-$Si_3N_4$ phase.

Although when the amorphous silicon nitride composition of the invention is crystallized it can be used to prepare ceramics for a variety of applications, the most significant benefit afforded by this composition is in the preparation of SiAlON which exhibits sustained high temperature strength. The SiAlON unit cell is like that of $\beta'$-$Si_3N_4$ and is commonly referred to as $\beta$-$Si_3N_4$. The SiAlON unit contains eight oxygen plus nitrogen atoms and has a range of homogeneity of $Si_{6-0.75x}Al_{0.67x}O_xN_{8-x}$ where $x$ can vary from 0 to a maximum of 6. SiAlON compositions can contain up to about 60% by weight of $Al_2O_3$ in solid solution and the X-ray patterns show a shift in "$d$" spacings of $\beta$-$Si_3N_4$ directly in proportion to the amount of $Al_2O_3$ in solid solution.

SiAlON is commonly prepared by reacting $Al_2O_3$ and conventionally prepared silicon nitride at elevated temperatures from 1500°C. to 1800°C. and pressures from atmospheric to 4000 psi in the presence of additives such as AlN and MgO to enhance densification. Although the additives do produce a dense SiAlON, they promote the presence of crystal phases other than the $\beta'$-$Si_3N_4$. These phases cause the SiAlON to lose strength, i.e., creep, at high temperatures, although the room temperature strength is usually satisfactory. When the SiAlON is used in ceramic applications which require sustained strength at high temperatures, e.g., 1100°C. to 1300°C., the ceramic often exhibits high temperature creep which renders it relatively useless in high temperature applications such as gas turbines.

The amorphous silicon nitride composition of the invention can be used directly, i.e., without prior crystallization, in place of conventionally prepared silicon nitride to prepare a fully dense SiAlON without the need for processing additives to enhance densification. The resulting SiAlON is a substantially pure $\beta'$-$Si_3N_4$ and exhibits sustained high temperature strength.

The following examples illustrate the invention.

EXAMPLE 1

Amorphous Silicon Nitride Composition

Using an apparatus as shown in FIG. 1, having a three-inch (7.62 cm) diameter alumina tube, the alumina tube is heated to 1300°C. and maintained at that temperature for three hours while the following gas flows are simultaneously introduced:

| Composition of the Gas | Gas Flow Rate (at Room Temperature) | |
|---|---|---|
| $N_2 + NH_3$ | 90.5 | l/hr. for $N_2$ |
| | 275 | l/hr. for $NH_3$ |
| $N_2$ ($SiCl_4$ carrier gas) | 120 | l/hr. |
| $SiCl_4$ | 530 | g/hr. |
| $CH_4$ | 96 | l/hr. |

After 3 hours at temperature the gas flows are terminated and 595 grams of powder is removed from the two product receivers 11 and 12 of FIG. 1. This powder is placed in a vycor tube and heated to 1050°C. for 4 hours to remove the residual $NH_4$ Cl and decompose any silicon imides which may be present. After heating 185 grams of powder, having a surface area of 28.1 m$^2$/g, are recovered from the vycor tube. The powder is analyzed and found to contain 0.44% by weight of carbon, the remainder being silicon nitride. X-ray diffraction shows the powder to be amorphous.

EXAMPLE 2 AND CONTROL

Crystalline Silicon Nitride Composition

Twenty grams of the amorphous silicon nitride composition described in Example 1 is heated to 1500°C. in an alumina tube under nitrogen for 1 hour. After cooling the alumina tube, the product is analyzed by X-ray diffraction and found to have a well-defined crystalline structure containing over 50% $\beta$-$Si_3N_4$, the remainder being $\alpha$-$Si_3N_4$.

Control

The procedure of Example 2 is followed except that a mixture of 0.1 gram of carbon black and 20 grams of a conventional amorphous silicon nitride prepared without carbon is used. The resulting product is analyzed by X-ray diffraction and exhibits a poorly defined crystalline structure containing predominantly $\alpha$-$Si_3N_4$ and trace amounts of $Si_2ON_2$.

EXAMPLE 3

SiAlON Composition

Twelve grams of the amorphous silicon nitride composition described in Example 1 and 19 grams of a commercially available $\alpha$-$Al_2O_3$ having an average particle size of 0.3$\mu$ are placed in a polyethylene jar containing alumina balls having a 0.5 inch (12.7 mm) diameter and rolled for 1 hour. The resulting mixture (containing 61.3% by weight of $Al_2O_3$ and 38.7% by weight of amorphous silicon nitride composition) is removed from the jar and alumina balls, then pressed into 0.5 inch (12.7 mm) discs between steel dies at a pressure of 10,000 psi. The pressed sample has a density of approximately 40% of the theoretical density of the mixture, i.e., 3.7 g/cm$^3$. The pressed sample is then heated to 1400°C. over a period of 3 hours in an alumina tube under a nitrogen/methane (volume ratio 90/10) atmosphere. The sample is cooled, crushed with a mortar and pestle, and again pressed as described above at 10,000 psi. The pressed sample has a density of approximately 55% of the theoretical value.

The sample is placed in a furnace and heated to 1700°C. over a 3 hour period under a nitrogen-methane (volume ratio 95/5) atmosphere. The sample is held at 1700°C. for 1 hour. The sample is then cooled under nitrogen and removed from the furnace.

The average density of the sample as measured using a pycnometer is 3.18 g/cm$^3$, compared to a theoretical density of 3.10 g/cm$^3$. The average density of the sample is slightly higher than the theoretical because of the presence of a small quantity of free $Al_2O_3$, i.e., $Al_2O_3$ not in solid solution. The X-ray diffraction analysis of this product, detailed in Table I, shows that the product is substantially pure SiAlON, having a major portion of the alumina, i.e., about 60% by weight of alumina, in solid solution with silicon nitride.

EXAMPLE 4

SiAlON Composition

The procedure of Example 3 is followed except that a mixture of 12 grams of $Al_2O_3$ and 19 grams of the amorphous silicon nitride composition (38.7% by weight of $Al_2O_3$ and 61.3% by weight of amorphous silicon nitride composition) are used.

The average density of the sample is 3.02 g/cm$^3$, compared to a theoretical density of 3.14 g/cm$^3$. The X-ray diffraction analysis of this product, detailed in Table I, shows that the product is substantially pure $\beta'$-$Si_3N_4$ having all the alumina present in solid solution.

EXAMPLE 5

SiAlON Ceramic

The procedure of Example 3 is followed except that the amorphous silicon nitride composition contains 0.35% by weight of carbon and is prepared according to the procedure of Example 1.

After final pressing (densification) the resulting 0.5 inch (12.7 mm) round is polished with a one micron diamond paste. The microhardness profile is determined by measuring the Knoop hardness across the polished surface at about 1/16 inch (0.16 cm) intervals using a Tukon Tester, Model MO, made by the Wilson Mechanical Instrument Division, American Chain and Cable Co., Inc. For each measurement the applied load is 1000 grams. The Knoop hardness for five measurements across the surface is 1198, 1198, 1155, 1198 and 1176, respectively, giving an average Knoop hardness of 1185.

These high and uniform microhardness values indicate that the SiAlON ceramic prepared from the amorphous silicon nitride composition containing carbon is uniformly dense.

TABLE I

| | X-Ray "d" Spacings | | | |
|---|---|---|---|---|
| | $\beta$-$Si_3N_4$* | Control SiAlON** | Example 3 | Example 4 |
| unit cell | $Si_6N_8$ | $Si_3Al_{2.67}N_4O_4$ | $Si_{2.25}Al_{3.35}N_3O_5$ | $Si_3Al_{2.67}N_4O_4$ |
| | 6.63 | 6.648 | 6.750 | 6.640 |
| | 2.668 | 2.717 | 2.755 | 2.712 |
| | 4.492 | 2.513 | 2.530 | 2.510 |

TABLE I-continued

| | X-Ray "d" Spacings | | |
|---|---|---|---|
| $\beta$-Si$_3$N$_4$* | Control SiAlON** | Example 3 | Example 4 |
| 1.341 | 1.357 | 1.360 | 1.355 |

*Reported "d" spacings for $\beta$-Si$_3$N$_4$, ASTM Card No. 9-259, S. N. Ruddlesden et al., ACTA Cryst. 11, 465 (1958).
**Reported "d" spacings for SiAlON (K. H. Jack and W. I. Wilson, Nature Physical Science, Vol. 238, page 28 (1972).

What is claimed is:

1. An amorphous silicon nitride composition consisting essentially of from 0.1% to 5.0% by weight of carbon, the remainder being 95.0% to 99.9% be weight of silicon nitride, Si$_3$N$_4$ carbon being uniformly distributed within the silicon-nitrogen bonds in the amorphous silicon nitride, said composition crystallizing upon heating in an inert atmosphere to a crystallizing temperature to form a crystallized powder which is at least 50% by weight in the $\beta$-Si$_3$N$_4$ phase, the remainder being in the $\alpha$-Si$_3$N$_4$ phase.

2. An amorphous silicon nitride composition according to claim 1 wherein the carbon is present in an amount from 0.3% to 1.0% by weight.

3. An amorphous silicon nitride composition according to claim 1 wherein the carbon is present in an amount from 0.4% to 0.5% by weight.

4. Vapor phase process for preparing an amorphous silicon nitride composition according to claim 1 by the steps of (i) intimately contacting gaseous silicon tetrachloride (SiCl$_4$), gaseous ammonia (NH$_3$) and a gaseous hydrocarbon at a temperature from 1000°C. to 1500°C., hydrocarbon does not substantially decompose to form carbon prior to reaction of SiCl$_4$ and NH$_3$ to form silicon nitride (ii) condensing the products of the vapor phase reaction of step (i) and (iii) recovering the amorphous silicon nitride composition.

5. Vapor phase process according to claim 4 wherein in step (i) the temperature is from 1200°C. to 1300°C.

6. Vapor phase process according to claim 4 wherein in step (iii) the amorphous silicon nitride is recovered by passing molecular nitrogen through the products of step (ii) at a temperature from 700°C. to 1050°C.

7. Vapor phase process according to claim 4 wherein in step (iii) the amorphous silicon nitride is recovered by passing a mixture of molecular nitrogen and CH$_4$ through the products of step (ii) at a temperature from 700°C. to 1050°C.

8. Vapor phase process according to claim 4 wherein in step (i) the gaseous hydrocarbon contains from 1 to 6 carbon atoms and from 4 to 14 hydrogen atoms.

9. Vapor phase process according to claim 8 wherein the gaseous hydrocarbon is methane (CH$_4$).

* * * * *